Figure 1:
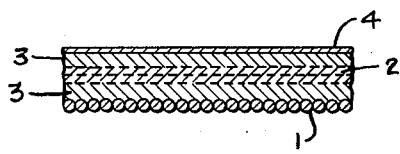

Aug. 21, 1956

F. LIMM 2,759,522

METHOD OF PRODUCING A LIGHT AND HEAT RADIATION
REFLECTING, FIREPROOF MATERIAL

Filed Jan. 19, 1954

INVENTOR:
FRIEDRICH LIMM,

United States Patent Office 2,759,522
Patented Aug. 21, 1956

2,759,522

METHOD OF PRODUCING A LIGHT AND HEAT RADIATION REFLECTING, FIREPROOF MATERIAL

Friedrich Limm, Schloss Hohenbrunn, near St. Florian, Austria, assignor to Far-Ex Corporation, Dover, Del., a corporation of Delaware Application January 19, 1954, Serial No. 404,887

Claims priority, application Austria September 23, 1948

6 Claims. (Cl. 154—28)

The invention relates to fireproof, light and heat radiation reflecting, flexible materials and to their particular use for the manufacture of heat and light radiation resistant apparel; the application is a continuation-in-part of my copending application Serial No. 106,337, filed July 22, 1949, now abandoned.

Materials of the above identified type which reflect light and heat and are sufficiently bendable to be used for the production of garments are greatly in need.

A typical example of this need is an apparel to be worn by fire fighting and rescue crews who must work in close proximity to fire and for whom protection by means of an asbestos insulation or by water sprays is not adapted to meet practical requirements.

It is the main object of this invention to provide a material which fully meets the above identified requirements, which is light, reflects heat radiation, preserves its initial bendability and softness and therefore can be successfully used for the manufacture of fire resistant garments which remain flexible in spite of extended use.

In conformity with the invention these flexible materials comprise a base sheet made of textiles; a layer of aluminum powder is applied to the one surface of this base sheet and is fastened to the same by an adhesive having properties, which will be specified as this description proceeds.

The base or foundation carrying the layer of bonded aluminum particles is covered with at least one aluminum foil, also the latter being secured to the aluminum particles carrying base by a suitable adhesive.

Apparel and suits manufactured from the material produced in conformity with the invention are particularly well suited to be used in fire-fighting activities.

Several modifications of the invention will now be described more in detail and with reference to the accompanying drawing.

In the drawing,

Figs. 1–5 illustrate on an enlarged scale vertical sectional views of various modifications of the material produced in conformity with the invention.

The material shown in Fig. 1 consists of a textile base or foundation 1 which is indicated by circles; an aluminum particle or powder layer 2 and indicated by short lines is bonded onto the base by an adhesive layer 3 into which the aluminum particles 2 are embedded. A top forming foil 4 is bonded to the aluminum particle layer 2 by an adhesive 3.

Figure 2:
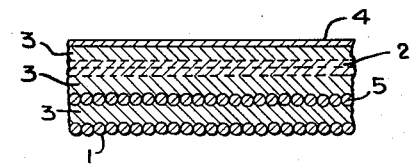

The modification of the invention, illustrated by Fig. 2, comprises a ductile textile base; this textile base 1 is superposed by a second textile base layer 5. The two textile layers 1 and 5 are bonded to each other by an adhesive 3. The further structure of this modification of the invention is identical to the one shown in Fig. 1.

Figure 3:
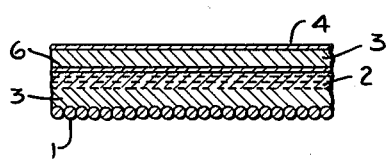

The embodiment of the invention, shown in Fig. 3, is differentiated from the one shown in Fig. 1 by the interposition of a second aluminum foil layer 6 located above the aluminum particle layer 2. The two aluminum foil layers 4 and 6 are bonded by the adhesive 3.

Figure 4:
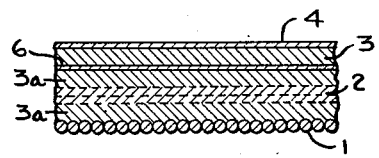

In conformity with Fig. 4, which otherwise is similar to Fig. 3, the adhesive layer which secures the aluminum particles 2 on the textile foundation 1 consists of two layers 3a between base 1 and aluminum foil 6.

Figure 5:
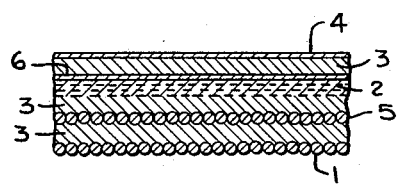

In accordance with Fig. 5 two textile layers 1, 5 and two aluminum foils 4, 6 are provided which are bonded by adhesives.

While the foundation 1 may be made of any type of a flexible material, cotton or glass fiber textiles are preferred; the textiles may be impregnated with fire preventive chemicals.

The adhesives used for the purposes of this invention are adapted to retain their flexibility after drying; they are preferably vinyl resins and may be selected from a group consisting of polyvinyl acetate, polyacrylic acid esters and mixed polymers thereof; these adhesives are preferably applied to the textile base 1 at a rate of about 30–70 grams per square meter.

The metallic components of the instant materials consist of layers of aluminum particles or aluminum powder and of one or more aluminum foils. The thickness of the aluminum foil layer may vary between about 0.006 to 0.012 millimeter.

A temperature of between about 50 to 75° C. should be maintained during the production of the articles in conformity with the invention.

The aluminum particle layer 2 may be applied to the textile base 1 and bonded therewith by the adhesive solution in any suitable manner; however, it is essential that the adhesive remains flexible after drying.

The aluminum particles may be dusted onto the textile foundation 1 or otherwise spread thereon or applied as a molten spray. This metal layer 2 may be applied in successive steps; in order to obtain uniformity with the aluminum foil layer 4 a finely ground aluminum powder is preferred. Aluminum powders of a 400 mesh size have proven to be satisfactory for use with the invention. The aluminum powder is preferably applied to the base at the order of about between 20–35 grams per square meter.

While a molten spray of the aluminum has certain advantages, best results, as far as protection against heat penetration is concerned, are attained when the adhesive binder connects the aluminum particles but itself remains clear and transparent.

The aluminum particle layer, regardless of how it is formed, should be kept as bright as possible and hence it may be variously cleaned, polished and calendered to render its reflective quality as equivalent to the foil layer as possible. Such finishing of the layer 2 does not reduce its ability to withstand flexing and stretching of the foundation sheet 1 as the individual metallic particles are able to return to their original positions without heat penetrating cracks being formed in the layer 2.

In accordance with the invention, the bonded aluminum particle layer 2 thus has a sufficient heat reflective quality to form an effective barrier against heat penetration should the foil layer 4 become torn, cracked or otherwise be damaged.

The aluminum foil is then secured to the aluminum particle layer by means of a suitable binder the foil being rolled onto the particle layer or otherwise applied thereto.

*Examples*

1. An adhesive consisting of the solution of a polyacrylic acid ester is applied to a cotton foundation at a rate of about 60 grams per square meter. A mixture of aluminum particles and of the same adhesive is now applied to the base at a rate of 20–35 grams per square meter. Onto the thus produced article a further layer of the same adhesive and an aluminum foil having a thickness of about 0.009 mm. are now applied.

A temperature of 70° C. is maintained during this procedure.

2. An adhesive layer consisting of polyvinyl acetate is applied to a gray-colored textile sheet at a temperature of about 70° C. and at a rate of about 50 grams per square meter. A second textile sheet is coated at the same temperature with the same adhesive at a rate of 40 grams per square meter.

These two textile sheets are superposed upon each other and while maintaining the same temperature of 70° C.

A layer of the same adhesive is applied to the one surface of the combined material and the same is now covered with a mixture of the adhesive and of aluminum powder whereby a ratio is maintained of 60 grams of the adhesive to 25 grams of the aluminum powder particles. The metallized surface of the thus compounded article is now coated with the adhesive and an aluminum foil having a thickness of 0.008 mm. is rolled upon the article at a temperature of 70° C. and bonded with the same.

3. An adhesive layer consisting of a polyacrylic acid ester solution is applied to a textile base at a rate of about 60 grams per square meter.

A mixture of aluminum particles and of the same adhesive is applied to the base material at a rate of 30 grams of the particles to 60 grams of the adhesive per square meter. The article is now flattened and covered with a further layer of this adhesive; two superposed aluminum foils having a thickness of 0.008 and 0.009 mm. are now bonded to the base material, which is covered with aluminum particles; a temperature of about 70° C. is maintained during the entire procedure.

Since certain changes in carrying out the above invention could be made without departing from the scope thereof, it is intended that all matter contained in the above description or shown in the accompanying drawing shall be interpreted as illustrative and not in a limiting sense.

It will be apparent to those skilled in the art that the novel principles of the invention disclosed herein in connection with specific exemplifications thereof will suggest various other modifications and applications of the same.

Having thus described the invention, what I claim as new and desire to be secured by Letters Patent, is as follows:

1. The method of producing a light and heat radiation reflecting heat resistant material particularly for the manufacture of a fire-fighting and heat protective apparel comprising applying to a flexible heat resistance base sheet an adhesive material layer, incorporating into said adhesive layer a layer consisting of aluminum particles and bonding onto said adhesive material layer at least one aluminum top foil.

2. The method of producing a light and heat radiation reflecting heat resistant material for the manufacture of a fire-fighting and heat protective apparel comprising applying to a flexible heat resistant base sheet consisting of a flame-proof woven fiber material an adhesive material layer of a vinyl resin, incorporating into said adhesive layer a layer of aluminum particles having a thickness of between about 0.006 to 0.012 millimeter and bonding onto said adhesive material layer an aluminum top foil having a thickness of between 0.005 to 0.0125 mm.

3. In a method according to claim 1 the step of replacing the aluminum top foil by two superposed aluminum foils and bonding the same by a layer of said adhesive material.

4. In a method according to claim 2 the step of applying the aluminum particles at the rate of about 20 to 25 grams and the adhesive at a rate of about 30 to 70 grams per square meter of said textile base sheet.

5. A light and heat radiation reflecting heat resistant material for the manufacture of fire-fighting heat-protective apparel comprising a flexible heat resistant base sheet, a layer consisting of aluminum particles applied to said base sheet and connected therewith by an adhesive material layer and at least one aluminum top foil covering said aluminum particles carrying adhesive material layer.

6. A light and heat radiation reflecting heat resistant material for the manufacture of fire-fighting and heat protective apparel comprising a flexible heat resistant base sheet, a layer consisting of aluminum particles having a thickness of 0.006 to 0.012 millimeter applied to said base sheet and connected therewith by an adhesive material layer and two superposed aluminum top foils covering said aluminum particles carrying layer and being connected by said adhesive material.

References Cited in the file of this patent

UNITED STATES PATENTS

| 1,987,605 | Croasdale et al. | Jan. 5, 1935 |
| 2,087,094 | McBurney et al. | July 13, 1937 |
| 2,098,754 | Nickowitz | Nov. 9, 1937 |
| 2,139,824 | Higgins | Dec. 13, 1938 |
| 2,226,589 | Smyers | Dec. 31, 1940 |
| 2,544,146 | Erickson | Mar. 6, 1951 |

FOREIGN PATENTS

| 668,267 | Great Britain | Mar. 12, 1952 |